C. E. DULIN.
ARMOR TIRED WHEEL.
APPLICATION FILED OCT. 28, 1908.
937,146.
Patented Oct. 19, 1909.
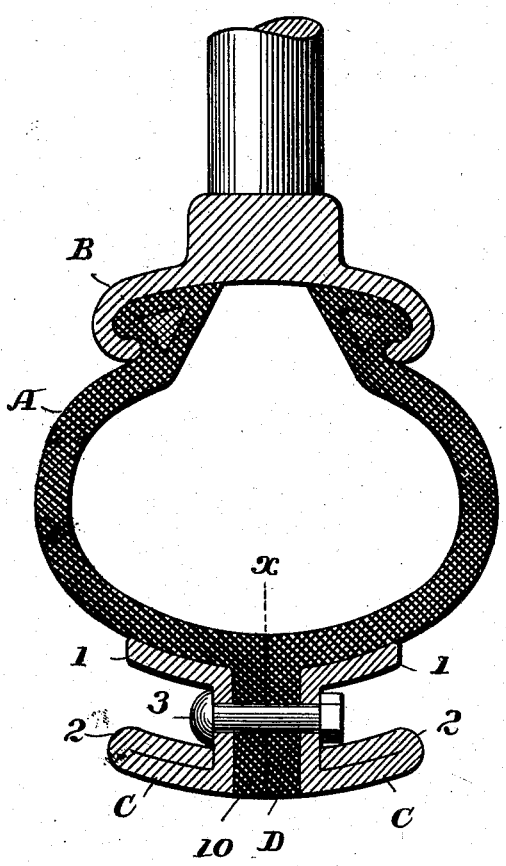
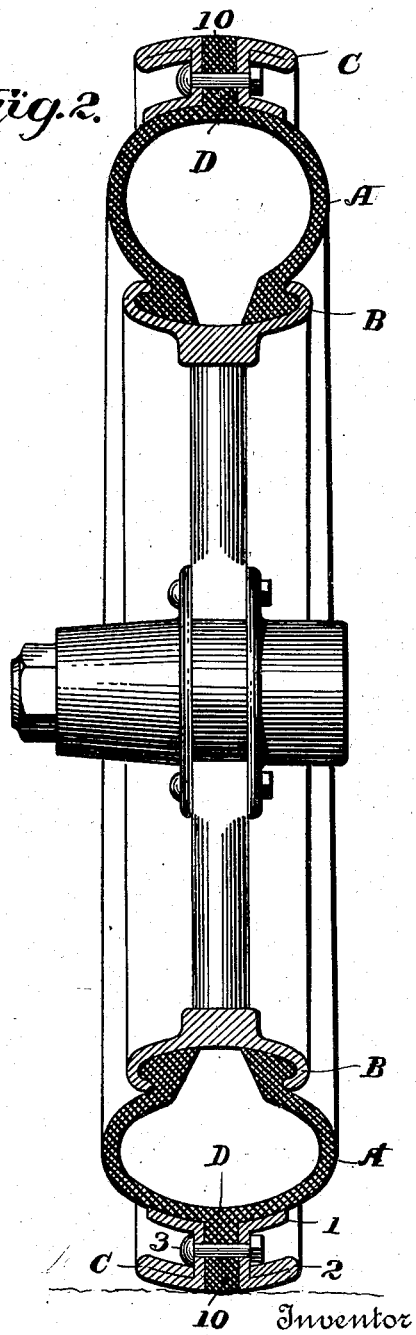
Witnesses
Inventor
Charles E. Dulin
Attorneys

UNITED STATES PATENT OFFICE.

CHARLES E. DULIN, OF GLENS FALLS, NEW YORK, ASSIGNOR OF ONE-HALF TO F. D. HOWLAND, OF SANDY HILL, NEW YORK.

ARMOR-TIRED WHEEL.

937,146.  Specification of Letters Patent.  Patented Oct. 19, 1909.

Application filed October 28, 1908. Serial No. 459,952.

*To all whom it may concern:*

Be it known that I, CHARLES E. DULIN, a citizen of the United States, and resident of Glens Falls, in the county of Warren and State of New York, have invented certain new and useful Improvements in Armor-Tired Wheels, of which the following is a specification.

My invention relates to rubber tired wheels and more especially to that class of wheels known as clencher wheels, and consists in forming the tire and providing the same with an armored or metallic tread, as fully set forth hereinafter and as illustrated in the accompanying drawing, in which:

Figure 1 is a cross sectional view at the lower part of the wheel showing the construction of the shoe and armored tread and its application to the clencher rim of a wheel; Fig. 2 is a cross sectional view of the wheel, showing the operation of the parts in use.

The shoe A as shown corresponds generally with an ordinary clencher shoe adapted to the clencher rim B of the wheel. The said shoe however, instead of being normally circular in cross section, as usual, is so constructed that it will be elliptical in cross section with the major axis of the ellipsis parallel to the axis of the wheel, as in Fig. 1.

At the periphery of the shoe A and integral therewith is a central annular flange D, and to this flange are fitted two metallic rings C, C, which, as shown, have annular flanges 1, 2, the flanges 1 fitted to the curved face of the periphery of the shoe and the flanges 2 constituting the metallic tread of the shoe on opposite sides of the central flange D the edge of which is flush with the outer faces of the flanges 2. The rings C, C are secured together and to the flange D by means of transverse bolts 3, and as thus applied the shoe and its rings constitute an armored shoe in which the metallic tread is practically rigid on opposite sides of a central yielding portion 10, the part on which the wheel mainly rests, so that while the advantages of a metallic tread are secured there is also secured the advantage of a yielding tread in preventing side slip, while the shoe with its usual contained inner tube (not shown) will secure the usual results of a pneumatic tire in reducing vertical vibrations.

Inasmuch as the normal form of the shoe in cross section is elliptical, any downward movement of the wheel with the periphery resting upon the ground will result in a lateral elongation of the ellipsis of that portion of the shoe which is between the wheel and the ground, which elongation contracts the cross sectional area and tends to displace the air and force it toward the top. This however results in a greater pressure upon the air throughout the tire because the top portion is elongated vertically throughout, tending to compress the air at this point inasmuch as the rings C, C are rigid and will not yield and there is a vertical separation of the rim and tread at the upper portion of the wheel which flattens this part of the shoe laterally.

While the shoe and its flange may be in one piece it may also be formed of two sections meeting on the line *x*, Fig. 1, which would facilitate manufacture.

Without limiting myself to the construction and arrangement shown I claim:

1. The combination with a flanged wheel rim, of a hollow shoe provided with a coöperating flange, adapted to be secured to the rim, said shoe being substantially elliptical in cross section, with the major axis parallel with the axis of the wheel and provided with a peripheral flange, and a pair of rigid rings clamped on opposite sides of the flange and immovably secured to the flange and the shoe.

2. The combination with the flanged rim of a wheel, of a clencher shoe adapted to said rim and with a central peripheral flange, the shoe and its flange in two sections, and two metallic rings fitted to opposite sides of said flange and secured thereto and to each other by cross bolts.

3. The combination with a flanged wheel rim, of a hollow clencher shoe secured to the rim, said shoe being substantially elliptical in cross section, with the major axis parallel with the axis of the wheel and provided with a peripheral flange, and a pair of channel shaped rigid metallic rings clamped on the opposite sides of the flange and immovably secured to the flange and the shoe.

In testimony whereof I affix my signature in presence of two witnesses.

CHARLES E. DULIN.

Witnesses:
 STEPHEN A. HAYX,
 W. R. COWLES.